(12) United States Patent
McGuire (10) Patent No.: US 7,802,816 B2
(45) Date of Patent: Sep. 28, 2010

(54) CONTROL ARM SUPPORT BRACKETS AND VEHICLES USING SAME

(75) Inventor: Jeremy T. McGuire, Powell, OH (US)

(73) Assignee: Honda Motor Company Ltd., Tokyo (JP)

( * ) Notice: Subject to any disclaimer, the term of this patent is extended or adjusted under 35 U.S.C. 154(b) by 296 days.

(21) Appl. No.: 12/127,048

(22) Filed: May 27, 2008

(65) Prior Publication Data

US 2009/0294199 A1    Dec. 3, 2009

(51) Int. Cl.
*B62D 21/11* (2006.01)
*B62D 21/02* (2006.01)

(52) U.S. Cl. .............. 280/788; 280/124.134; 280/124.145; 280/785; 280/781; 180/311; 180/908

(58) Field of Classification Search .......... 280/124.134, 280/124.145, 124.109, 788, 785, 781; 180/311, 180/312, 908
See application file for complete search history.

(56) References Cited

U.S. PATENT DOCUMENTS

| | | | | | |
|---|---|---|---|---|---|
| 1,468,522 | A | * | 9/1923 | Snell et al. | 180/315 |
| 2,554,261 | A | * | 5/1951 | Munger | 180/432 |
| 2,645,519 | A | * | 7/1953 | Stanfield et al. | 296/198 |
| 2,939,720 | A | * | 6/1960 | Wroby | 280/124.108 |
| 3,243,007 | A | * | 3/1966 | Berckhan | 180/256 |
| 4,240,517 | A | | 12/1980 | Harlow, Jr. et al. | |
| 4,811,812 | A | * | 3/1989 | Cassese | 180/295 |
| 4,869,539 | A | * | 9/1989 | Cassese | 280/781 |
| 5,280,957 | A | * | 1/1994 | Hentschel et al. | 280/788 |
| 5,556,133 | A | * | 9/1996 | Oku et al. | 280/781 |
| 5,855,250 | A | * | 1/1999 | Nishi | 180/312 |
| 5,915,727 | A | * | 6/1999 | Bonnville | 280/788 |
| 5,954,364 | A | * | 9/1999 | Nechushtan | 280/781 |
| 5,967,537 | A | | 10/1999 | Chang | |
| 6,099,039 | A | | 8/2000 | Hine | |
| 6,170,875 | B1 | * | 1/2001 | Jones et al. | 280/788 |
| 6,296,163 | B1 | * | 10/2001 | Kitao et al. | 224/401 |
| 6,398,262 | B1 | * | 6/2002 | Ziech et al. | 280/785 |
| 6,409,216 | B2 | | 6/2002 | Suzuki | |
| 6,412,856 | B1 | * | 7/2002 | Kajikawa et al. | 296/203.01 |
| 6,547,027 | B1 | * | 4/2003 | Kalhok et al. | 180/312 |
| 6,588,536 | B1 | * | 7/2003 | Chiu | 180/312 |
| 6,623,020 | B1 | * | 9/2003 | Satou | 280/124.109 |

(Continued)

FOREIGN PATENT DOCUMENTS

EP    636531 A2 *  2/1995

(Continued)

*Primary Examiner*—Paul N Dickson
*Assistant Examiner*—Nicole Verley
(74) *Attorney, Agent, or Firm*—Ulmer & Berne LLP (57) ABSTRACT

A vehicular frame assembly is provided and includes a pair of control arm support brackets. Each of the control arm support brackets define a pair of recesses. The first control arm support bracket and the second control arm support bracket are substantially identical and are configured to be positioned along a vehicular frame such that one of the pairs of recesses defined by a control arm support bracket receives forward legs of right and left suspension support members and the other of the pairs of recesses defined by the other of the control arm support bracket receives rearward legs of right and left suspension support members. A vehicle is also provided.

22 Claims, 6 Drawing Sheets

U.S. PATENT DOCUMENTS

| | | | |
|---|---|---|---|
| 6,648,351 | B1 | 11/2003 | Kosak |
| 6,695,329 | B2 * | 2/2004 | Handa ................. 280/124.135 |
| 6,702,058 | B2 * | 3/2004 | Ishii et al. ................... 180/311 |
| 6,799,781 | B2 * | 10/2004 | Rasidescu et al. .......... 280/781 |
| 6,866,295 | B2 | 3/2005 | Ziech et al. |
| 6,893,046 | B2 * | 5/2005 | Ledesma et al. ............ 280/788 |
| 6,931,770 | B2 | 8/2005 | Belzile |
| 7,077,407 | B2 | 7/2006 | Shin |
| 7,306,069 | B2 * | 12/2007 | Takeshima et al. .......... 180/312 |
| 7,311,171 | B2 * | 12/2007 | Seki et al. ................... 180/312 |
| 7,370,871 | B2 * | 5/2008 | Cho ................... 280/124.109 |
| 7,422,082 | B2 * | 9/2008 | Reffitt ....................... 180/90.6 |
| D586,696 | S * | 2/2009 | Burns .......................... D12/87 |
| 7,618,063 | B2 * | 11/2009 | Takeshima et al. .......... 280/785 |
| 7,648,170 | B2 | 1/2010 | Geslin et al. ................ 280/785 |
| 7,690,661 | B2 * | 4/2010 | Tsuruta et al. ........ 280/124.135 |
| 7,694,769 | B2 * | 4/2010 | McGuire ................... 180/208 |
| 7,717,220 | B2 * | 5/2010 | Singh et al. ................. 180/312 |
| 2003/0111834 | A1 * | 6/2003 | Ledesma et al. ............ 280/788 |
| 2003/0121711 | A1 * | 7/2003 | Chiu .......................... 180/312 |
| 2005/0205320 | A1 * | 9/2005 | Girouard et al. ............ 180/190 |
| 2005/0275181 | A1 | 12/2005 | MacIsaac |
| 2007/0045979 | A1 * | 3/2007 | Cho ................... 280/124.109 |
| 2007/0084656 | A1 * | 4/2007 | Chang ........................ 180/208 |
| 2007/0193813 | A1 * | 8/2007 | Schlangen et al. .......... 180/312 |
| 2007/0251751 | A1 * | 11/2007 | Ball et al. ................... 180/312 |
| 2007/0262549 | A1 * | 11/2007 | Haerr et al. ............ 280/124.103 |
| 2008/0042390 | A1 * | 2/2008 | Geslin et al. .............. 280/124.1 |
| 2008/0042391 | A1 * | 2/2008 | Holland et al. ........ 280/124.134 |
| 2008/0067774 | A1 * | 3/2008 | Sanville et al. ........ 280/124.138 |
| 2008/0277184 | A1 * | 11/2008 | Marleau ..................... 180/312 |
| 2009/0178871 | A1 * | 7/2009 | Sunsdahl et al. ............ 180/233 |

FOREIGN PATENT DOCUMENTS

| | | | |
|---|---|---|---|
| JP | 03065487 | A * | 3/1991 |
| JP | 05105159 | A * | 4/1993 |

* cited by examiner

CONTROL ARM SUPPORT BRACKETS AND VEHICLES USING SAME

TECHNICAL FIELD

The inventive principles generally relate to control arm support brackets provided on a vehicle to pivotally support a control arm.

BACKGROUND

A pair of control arm support brackets can be provided on a vehicle to pivotally support a control arm with respect to a frame of the vehicle. Suspension support members can also be provided on a vehicle to support cushions. Conventionally, the suspension support members are coupled with the frame at substantially the same location as the control arm support brackets. Each control arm support bracket is typically uniquely configured according to the location of the control arm support brackets with respect to the suspension support members.

SUMMARY

A vehicular frame assembly is provided. The vehicular frame assembly can comprise a frame, a left suspension support member, a right suspension support member, a first control arm support bracket, and a second control arm support bracket. The frame is intersected by an imaginary plane which bisects the frame into left and right sides. The left suspension support member is coupled with the left side of the frame and comprises a left forward leg and a left rearward leg. The right suspension support member is coupled with the right side of the frame and comprises a right forward leg and a right rearward leg. The first control arm support bracket defines a first pair of recesses and is secured to the frame in a first orientation such that the left forward leg of the left suspension support member is at least partially disposed within one recess of the first pair of recesses and the right forward leg of the right suspension support member is at least partially disposed within the other recess of the first pair of recesses. The second control arm support bracket defines a second pair of recesses and is secured to the frame in a second orientation such that the left rearward leg of the left suspension support member is at least partially disposed within one recess of the second pair of recesses and the right rearward leg of the right suspension support member is at least partially disposed within the other recess of the second pair of recesses. The first and second control arm support brackets are substantially identical.

A vehicular frame assembly is also provided. The vehicular frame assembly comprises a first control arm support bracket and a second control arm support bracket. The first control arm support bracket comprises a first end, a second end, a sidewall, an upper portion and a lower portion. The first control arm support bracket defines a first pair of recesses. The first pair of recesses is at least partially defined by the sidewall and extends between the upper portion of the first control arm support bracket and the lower portion of the first control arm support bracket. The second control arm support bracket comprises a first end, a second end, a sidewall, an upper portion and a lower portion. The second control arm support bracket defines a second pair of recesses. The second pair of recesses is at least partially defined by the sidewall and extends between the upper portion of the second control arm support bracket and the lower portion of the second control arm support bracket. The control arm support bracket and the second control arm support bracket are substantially identical. The control arm support bracket and the second control arm support bracket are configured to be positioned along a vehicular frame such that one of the first or second pairs of recesses receives forward legs of right and left suspension support members and the other of the first pair or second pair of recesses receives rearward legs of right and left suspension support members.

A method for assembling a vehicular frame assembly is provided. The method comprises providing a vehicular frame, the vehicular frame being intersected by an imaginary plane which bisects the frame into left and right sides. The method further comprises securing left and right suspension supports to the vehicular frame. The left suspension support comprises a left forward leg and a left rearward leg. The right suspension support comprises a right forward leg and a right rearward leg. The method further comprises providing a pair of substantially identical control arm support brackets. Each control arm support bracket comprises a first end, a second end, and a sidewall at least partially defining a pair of U-shaped recesses. The method further comprises arranging the pair of control arm support brackets in differing orientations along the vehicular frame such the left and right forward legs are at least partially disposed within one pair of recesses and the left and right rearward legs are at least partially disposed within the other pair of recesses.

A vehicular frame assembly is provided. The vehicular frame assembly comprises a frame, a left suspension support member, a right suspension support member, and a pair of control arm support brackets. The frame is intersected by an imaginary plane which bisects the frame into left and right sides. The left suspension support member is coupled with the left side of the frame and comprises a left forward leg and a left rearward leg. The right suspension support member is coupled with the right side of the frame and comprises a right forward leg and a right rearward leg. Each control arm support bracket defines a pair of recesses. One of the control arm support brackets is secured to the frame in a first orientation such that the left forward leg of the left suspension support member and the right forward leg of the right suspension support member are at least partially disposed within respective ones of the pair of recesses defined by the one control arm support bracket. The other of the control arm support brackets is secured to the frame in a second orientation such that the left rearward leg of the left suspension support member and the right rearward leg of the right suspension support member are at least partially disposed within respective ones of the pair of recesses defined by the other control arm support bracket. The control arm support brackets are substantially identical to facilitate arrangement of each control arm support bracket in either the first orientation or the second orientation.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
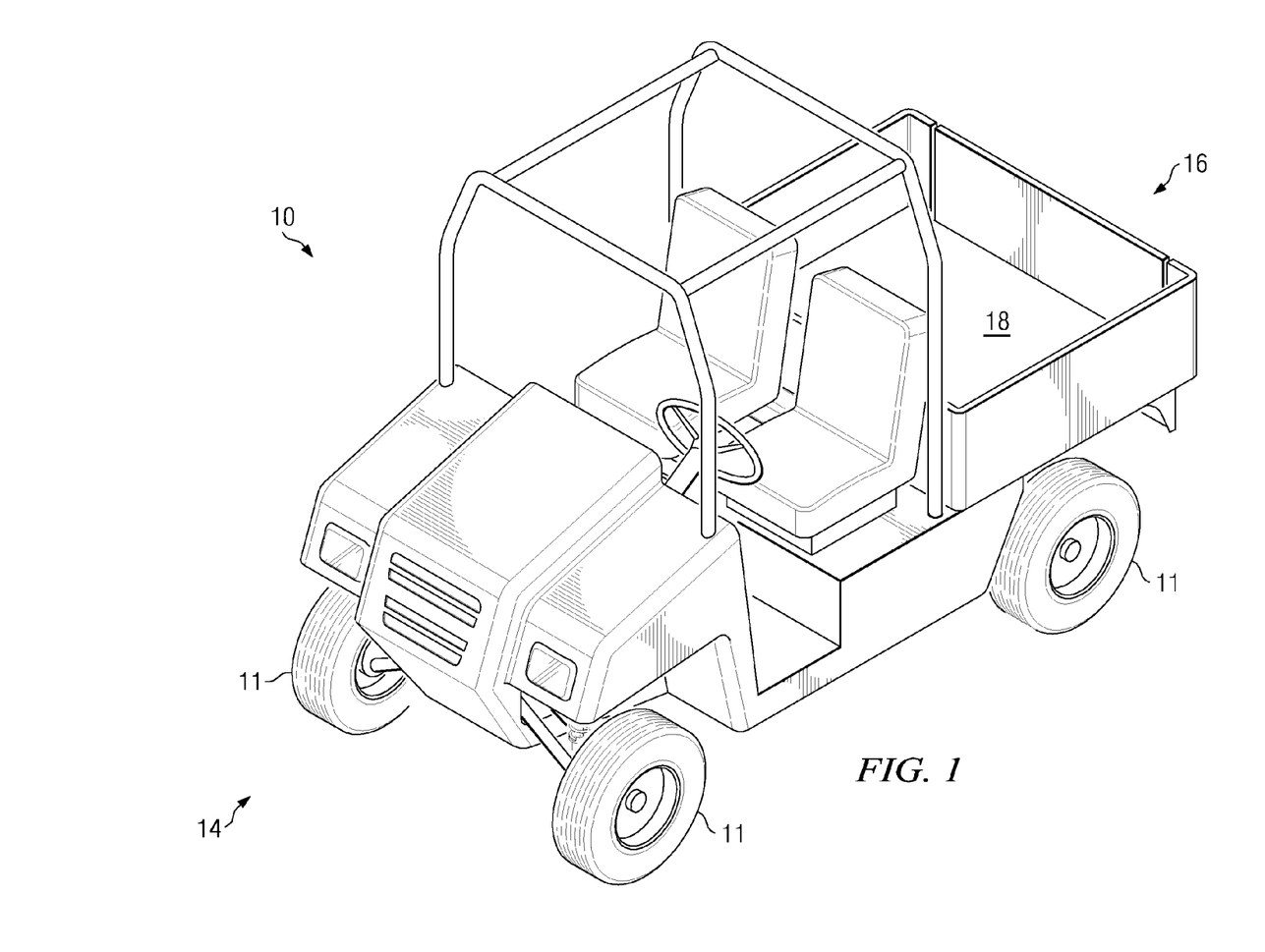
FIG. 1 is an elevated front perspective view depicting a utility vehicle ("UTV") in accordance with one embodiment.

A vehicle and its operation are hereinafter described in detail in connection with the views and examples of FIGS. 1-6, wherein like numbers indicate the same or corresponding elements throughout the views. FIG. 1 shows a vehicle 10 which can incorporate a frame assembly (e.g., 12 in FIGS. 2-6). The vehicle 10 is shown in FIG. 1 to be a utility vehicle ("UTV"). However, other vehicles can be provided, such as, for example, an automobile, a truck, a van, a recreational vehicle, an all terrain vehicle, agricultural equipment, or construction equipment. Though the vehicle 10 is shown to be of a type having four wheels (e.g., 11), it will be appreciated that other vehicles can alternatively include more than four wheels or less than four wheels.

The vehicle 10 can include and extend between front and rear ends 14, 16 as shown in FIG. 1. As illustrated in FIGS. 2-5, the vehicle 10 can include a frame assembly 12 which can extend between the front end 14 and the rear end 16 of the vehicle 10. The frame assembly 12 can include a frame 20. The frame 20 is shown in FIGS. 2-5 to be a rail-type frame that includes a left frame rail 22 and a right frame rail 24, each extending between the front end 14 and the rear end 16 of the vehicle 10. The frame 20 is shown to be bisected into left and right sides by an imaginary plane, P, and the left and right frame rails 22, 24 are shown to be disposed on opposite sides of the frame. It will be appreciated that, although the left and right frame rails 22, 24 are shown to be formed of a tubular construction, a frame can be formed from box rails, stamped sheet metal components, or any of a variety of alternative configurations. It will also be appreciated that a frame can be provided in any of a variety of alternative arrangements such as an integrated, uni-body construction.

As is common, the frame 20 can support any of a variety of vehicular components. For example, the vehicle 10 can comprise a bed 18 supported by the frame 20. The bed 18 can facilitate support of cargo for transportation by the vehicle 10. Although the bed 18 is shown in FIG. 1 to include sides to facilitate support of loose cargo (e.g., dirt), it will be appreciated that the bed 18 can be configured in any of a variety of suitable alternative arrangements (e.g., as a flat bed) for carrying cargo. It will also be appreciated that, in lieu of a bed, a vehicle can include a cargo rack, a pump unit, a digging implement, a towing platform, a crane, or any of a variety of other implements.

Figure 2:
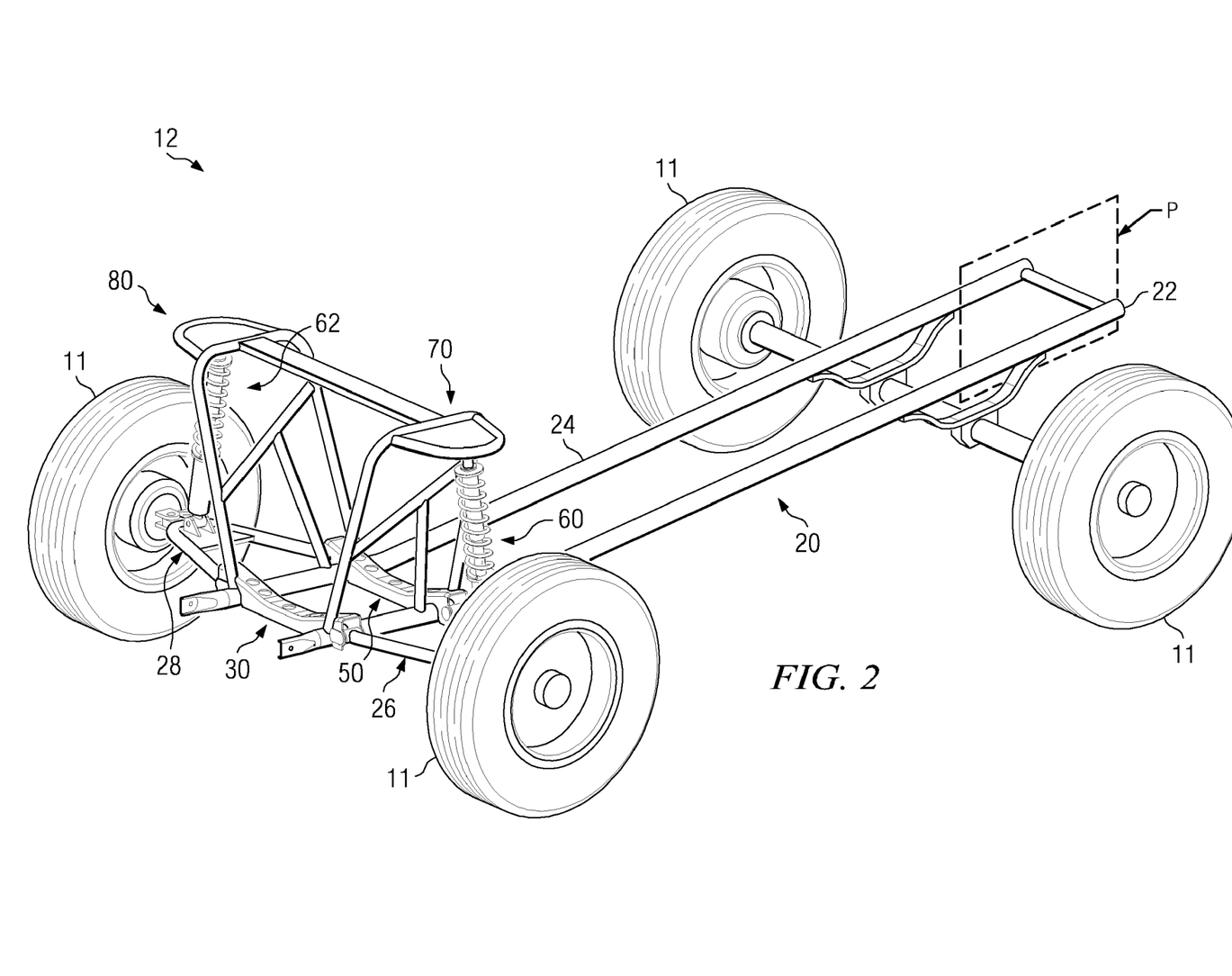
FIG. 2 is an elevated front perspective view of a frame assembly of the vehicle of FIG. 1.
Figure 3:
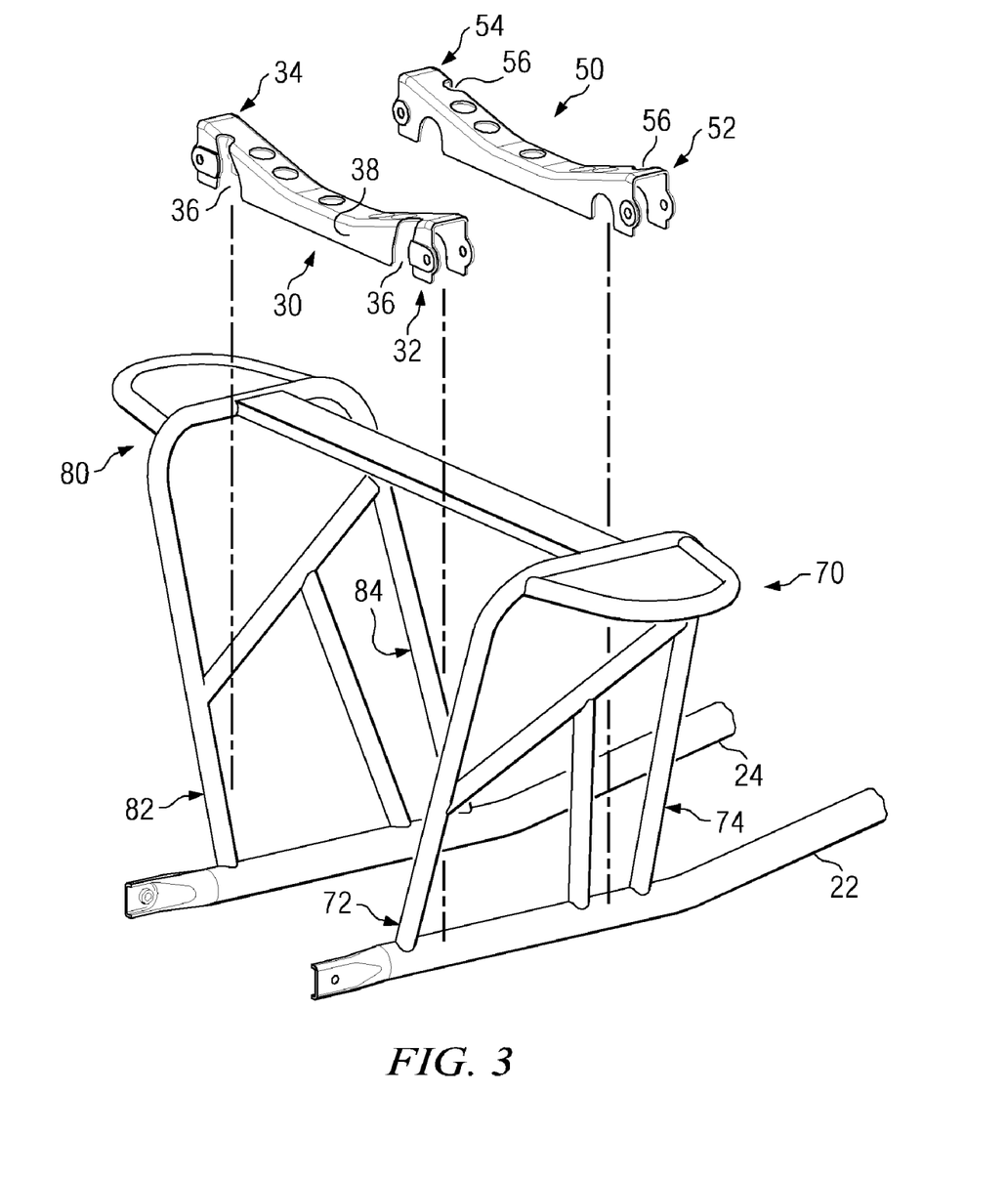
FIG. 3 is an exploded front perspective view of a front end of the frame assembly of FIG. 2 depicting first and second control arm support brackets wherein certain other components have been removed for clarity of illustration.
Figure 4:
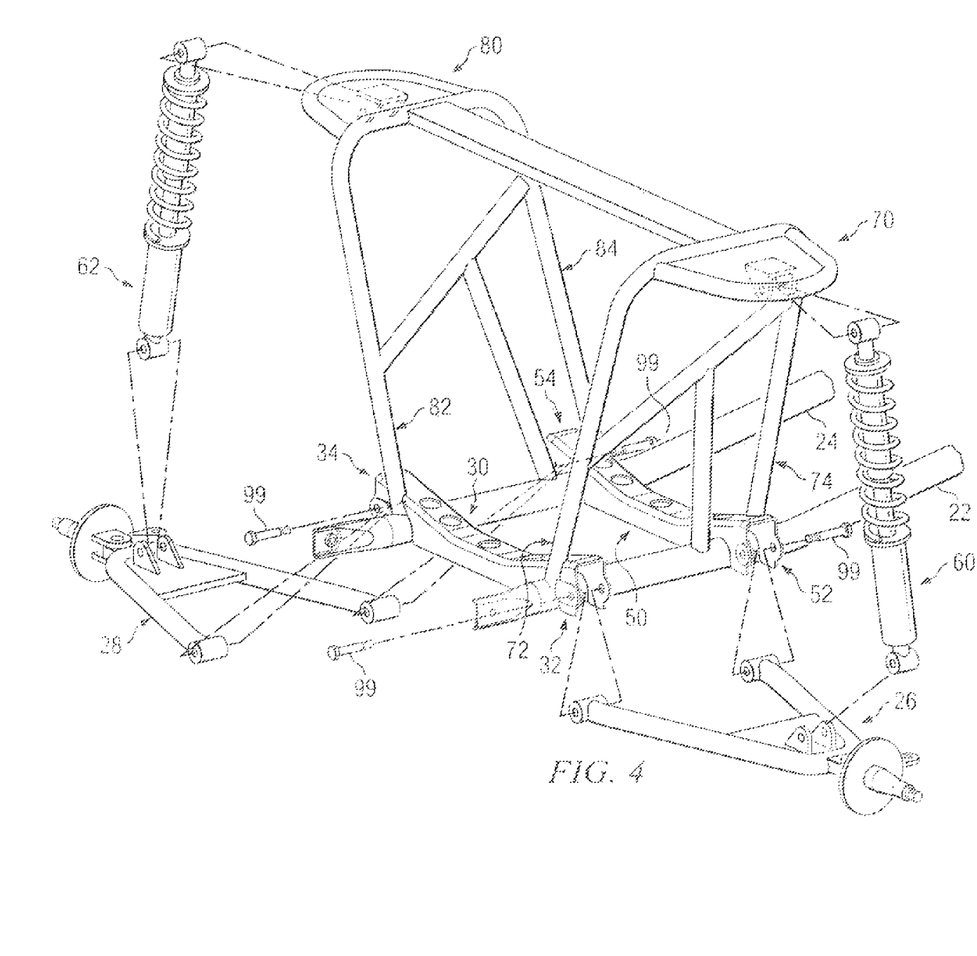
FIG. 4 is an exploded front perspective view of a front end of the frame assembly of FIG. 2 depicting left and right control arms and left and right cushions in association with the first and second control arm support brackets.
Figure 5:
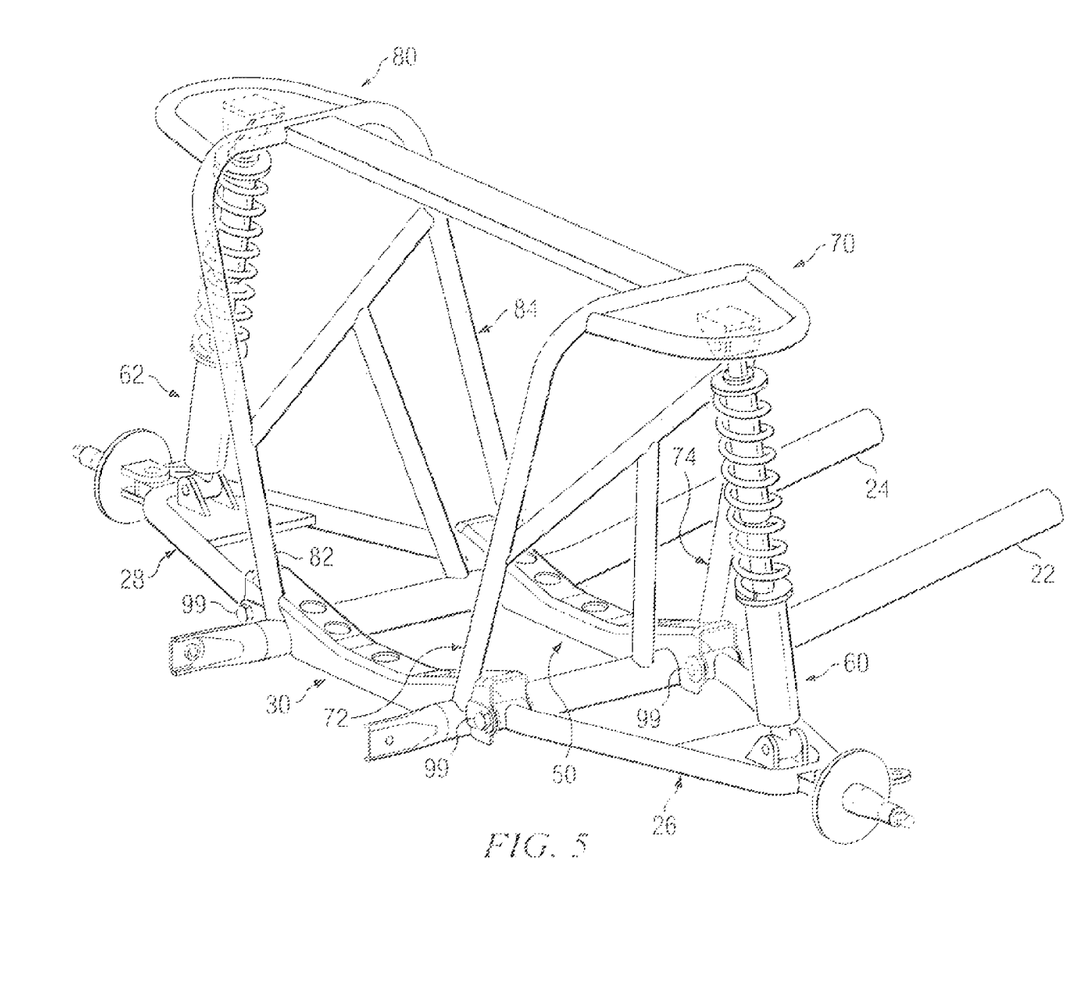
FIG. 5 is a front perspective view of the components of FIG. 4 as assembled.

Left and right control arms 26, 28 can be pivotally supported along the frame 20 to facilitate support of wheels 11 with respect to the frame 20. The left and right control arms 26, 28 are shown in FIG. 2 to be pivotally supported along the frame 20 by first and second control arm support brackets 30, 50. In one embodiment, and as illustrated in FIGS. 3-5, the first control arm support bracket 30 can be an elongate member extending between a left end 32 and a right end 34 and having a substantially polygonal cross-section. Similarly, the second control arm support bracket 50 can be an elongate member extending between a left end 52 and a right end 54 and having a substantially polygonal cross-section. However, it will be appreciated that the first and second control arm support bracket 30, 50 can be any of a variety of configurations that facilitate support of control arms with respect to a frame. For example, a first and second control arm support bracket can each be formed from U-channel construction.

The first and second control arm support brackets 30, 50 can be configured to pivotally support one or more control arms (e.g., 26, 28). In one embodiment as shown in FIGS. 2-5, the first and second control arm support brackets 30, 50 can define channeled portions along each of the left ends 32, 52 and the right ends 34, 54. The first and second control arm support brackets 30, 50 can cooperate to support each of the left and right control arms 26, 28. For example, portions of the left control arm 26 is shown in FIG. 5 to be disposed within the channeled portions of the left ends 32, 52 of the first and second control arm support brackets 30, 50 and pivotally supported with bolts 99. Similarly, portions of the right control arm 28 is shown to be disposed within the channeled portions of the right ends 34, 54 of the first and second control arm support brackets 30, 50 and pivotally supported with bolts 99. It will be appreciated that ends of first and second support brackets can pivotally support control arms in any of a variety of alternative arrangements (e.g., ball and socket). Furthermore, although the control arms 26, 28 are illustrated in an A-arm configuration, it will be appreciated a control arm can be provided in any of a variety of configurations (e.g., elongate, L-shaped).

As is common, a cushion, such as a shock or strut, can be supported between a control arm (e.g., 26, 28) and the frame 20 to dampen sudden movement of the control arm with respect to the frame 20 during vehicle travel. As illustrated in FIG. 2, a left suspension support member 70 can be secured with the left frame rail 22 and a right suspension support member 80 can be secured with the right frame rail 24. A left cushion 60 is shown to be supported between the left control arm 26 and the left suspension support member 70. Similarly, a right cushion 62 is shown to be supported between the right control arm 28 and the right suspension support member 80. The right and left suspension support members 70, 80 are shown to be respectively formed from tubular construction. However, it will be appreciated that right and left suspension support members 70, 80 can have any of a variety of configurations to facilitate securement of left and right cushions 60, 62 to a frame. For example, the right and left suspension support members 70, 80 can be integrally formed from one-piece construction. It will also be appreciated that while the right and left cushions 60, 62 are shown to include hydraulic suspension members, any of a variety of suitable alternative cushion configurations can be provided (e.g., a spring, a linear electromagnetic motor).

It will be appreciated from FIGS. 2-5 that to support the left and right control arms 26, 28 adjacent to the left and right suspension support members 70, 80, the first and second control arm support brackets 30, 50 and the left and right suspension support members 70, 80 can be coupled with the frame 20 in substantially the same location. The control arm support brackets 30, 50 are shown in FIG. 3 to respectively define a first pair of recesses 36 and a second pair of recesses 56. The recesses 36, 56 can correspond with the left and right suspension support members 70, 80 such that, when the control arm support brackets 30, 50 are coupled with the frame 20, the left and right suspension support members 70, 80 are at least partially disposed in the recesses 36, 56. For example, with reference to FIGS. 2 and 3, the first control arm support bracket 30 is shown to be in a first orientation such that a left forward leg 72 of the left suspension support member 70 is partially disposed within one recess 36 and a right forward leg 82 of the right suspension support member 80 is partially disposed within the other recess 36. Additionally, the second control arm support bracket 50 is shown in a second orientation such that a left rearward leg 74 of the left suspension support member 70 is partially disposed within one recess 56 and a right rearward leg 84 of the right suspension support member 80 is partially disposed within the other recess 56.

The recesses 36, 56 are shown in FIGS. 2-6 to be generally U-shaped and defined by respective sidewalls (e.g., 38, 58) of the first and second control arm support brackets 30, 50. It will be appreciated, however, that recesses can have any of a variety of shapes or configurations to facilitate securement of the first and second control arm support brackets 30, 50 and the left and right suspension support members 70, 80 in substantially the same location. For example, recesses can be defined by upper and lower portions of the first and second control arm support brackets 30, 50 such that a passage is formed therethrough. Furthermore, it will be appreciated that the recesses can be provided along first and second support brackets in any of a variety of locations to correspond with respective suspension support members provided on a frame.

Although the first control arm support bracket 30 and the second control arm support bracket 50 are shown in FIGS. 2-5 to be arranged such that recesses 36 face away from recesses 56, it will be appreciated that first and second support brackets can be coupled with a frame 20 in any of a variety of orientations. For example, a first control arm support bracket and a second control arm support bracket can be arranged along a frame such that each pair of recesses faces the front end 14 of the vehicle 10. In another example, a first control arm support bracket and a second control arm support bracket can be arranged along a frame such that each pair of recesses faces the rear end 16 of the vehicle 10. In yet another example, a first control arm support bracket and a second control arm support bracket can be arranged along a frame such that each pair of recesses faces one another.

It will be appreciated that left and right control arms, 26, 28, left and right suspension support members 70, 80, and first and second control arm support brackets 30, 50 can support wheels (e.g., 11) along a vehicle in any of a variety of arrangements. For example, in one alternative embodiment, left and right control arms, left and right suspension support members, and first and second control arm support brackets can be provided along a rear of a vehicle to support rear wheels with respect to a frame.

Figure 6:
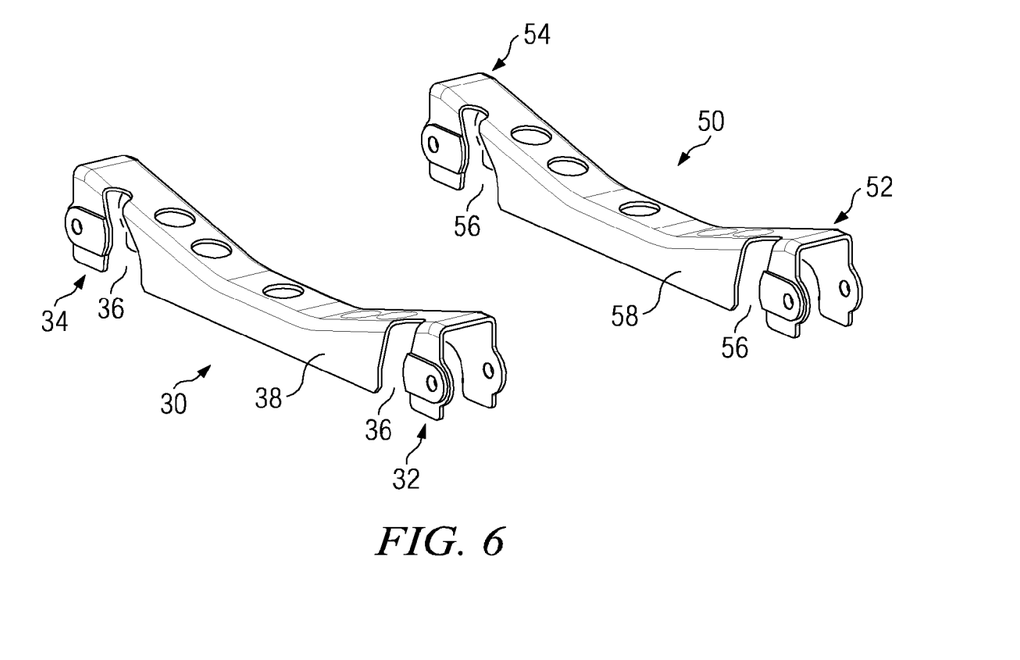
FIG. 6 is a perspective view of the first and second control arm support brackets of FIG. 4 apart from the remaining components of FIG. 4.

It will be appreciated that the first control arm support bracket 30 and the second control arm support bracket 50 can be substantially identical. In one embodiment as illustrated in FIG. 6, each of the first and second control arm support brackets 30, 50 can be completely identical. By providing substantially or completely identical first and second control arm support brackets 30, 50, it will be appreciated that the first and second control arm supports 30, 50 can be interchanged. For example, although the first control arm support bracket 30 is shown in FIGS. 3-5 to be in the first orientation, as described above, the first control arm support bracket 30 can alternatively be arranged along the frame 20 such that the left rearward leg 74 of the left suspension support member 70 and the right rearward leg 84 of the right suspension support member 80 are disposed partially within recesses 36. In addition, although the second control arm support bracket 50 is shown in FIGS. 3-5 to be in the second orientation, as described above, the second control arm support bracket 50 can alternatively be arranged along the frame 20 such that the left forward leg 72 of the left suspension support member 70 and the right forward leg 82 of the right suspension support member 80 are disposed partially within recesses 56.

It will be also be appreciated that identical first and second control arm support brackets 30, 50 can provide improvements over conventional, location-specific control arm support brackets. For example, since one bracket configuration is suitable for both the first and second control arm support brackets 30, 50, less tooling is needed to form the first and second control arm support brackets 30, 50. Additionally, by having less tooling and less equipment, the process of forming brackets can be more streamlined, thereby reducing the time necessary to make each bracket. Furthermore, during assembly of a vehicle, utilizing one bracket configuration can reduce the time necessary in selecting a proper bracket for each particular orientation, and can reduce the number of different types of components needed to manufacture a vehicle.

A method can also be provided for assembling a vehicular frame assembly in accordance with the embodiment described above. In one embodiment, the method can include providing the frame 20 and securing the left and right suspension supports 70, 80 to the frame 20, such as for example with a welding process. As shown in FIG. 3, the first and second control arm support brackets 30, 50 can be arranged in differing orientations such that left and right forward legs 72, 82 of the left and right suspension supports 70, 80 are at least partially disposed within recesses 36 of the first control arm support bracket 30 and the left and right rearward legs 74, 84 of the left and right suspension supports 70, 80 are at least partially disposed within recesses 56 of the second control arm support bracket 50. The first and second control arm support brackets 30, 50 can be welded to the frame 20, bolted to the frame 20, integrally formed with the frame 20 as part of a one-piece construction, or attached in any of a variety of suitable alternative arrangements. The left control arm 26 can be pinned as shown in FIG. 4 (e.g., with pins 99) to the left ends 32, 52 of the first and second control am support brackets 30, 50. Similarly, the right control arm 28 can be pinned as shown in FIG. 4 (e.g., with pins 99) to the right ends 34, 54 of the first and second control arm support brackets 30, 50. As further shown in FIG. 4, the left cushion 60 can be supported between the left suspension support member 70 and the left control arm 26 and the right cushion 62 can be supported between the right suspension support member 80 and the right control arm 28.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope of the inventive concepts are, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicular frame assembly comprising:
   a frame intersected by an imaginary plane which bisects the frame into left and right sides;
   a left suspension support member coupled with the left side of the frame and comprising a left forward leg and a left rearward leg;
   a right suspension support member coupled with the right side of the frame and comprising a right forward leg and a right rearward leg;

a first control arm support bracket defining a first pair of recesses and being secured to the frame in a first orientation such that the left forward leg of the left suspension support member is at least partially disposed within one recess of the first pair of recesses and the right forward leg of the right suspension support member is at least partially disposed within the other recess of the first pair of recesses; and a second control arm support bracket defining a second pair of recesses and being secured to the frame in a second orientation such that the left rearward leg of the left suspension support member is at least partially disposed within one recess of the second pair of recesses and the right rearward leg of the right suspension support member is at least partially disposed within the other recess of the second pair of recesses;

wherein the first and second control arm support brackets are substantially identical.

2. The vehicular frame assembly of claim 1 wherein the first control arm support bracket comprises a first end and a second end and the second control arm support bracket comprises a first end and a second end, and wherein the frame assembly further comprises:

a right control arm pivotally supported by the first ends of the first and second control arm support brackets; and a left control arm pivotally supported by the second ends of the first and second control arm support brackets.

3. The vehicular frame assembly of claim 2 wherein the first end and the second end of the first control arm support bracket each respectively define one recess of the first pair of recesses and the first end and the second end of the second control arm support bracket each respectively define one recess of the second pair of recesses.

4. The vehicular frame assembly of claim 3 further comprising a left cushion and a right cushion, wherein the left cushion is supported between the left suspension support member and the left control arm and the right cushion is supported between the right suspension support member and the right control arm.

5. The vehicular frame assembly of claim 1 wherein each recess of the first and second pairs of recesses are substantially U-shaped.

6. The vehicular frame assembly of claim 5 wherein the first pair of recesses faces forwardly and the second pair of recesses faces rearwardly when the first and second control arm support brackets are secured to the frame.

7. A vehicle comprising the vehicular frame assembly of claim 1.

8. A vehicular frame assembly comprising:

a first control arm support bracket comprising a first end, a second end, a sidewall, an upper portion and a lower portion, the first control arm support bracket defining a first pair of recesses, wherein the first pair of recesses are at least partially defined by the sidewall and extend between the upper portion of the first control arm support bracket and the lower portion of the first control arm support bracket; and a second control arm support bracket comprising a first end and a second end, a sidewall, an upper portion and a lower portion, the second control arm support bracket defining a second pair of recesses, wherein the second pair of recesses are at least partially defined by the sidewall and extend between the upper portion of the second control arm support bracket and the lower portion of the second control arm support bracket;

wherein the first control arm support bracket and the second control arm support bracket are interchangeable and are configured to be positioned along a vehicular frame such that one of the first or second pairs of recesses receives forward legs of right and left suspension support members and the other of the first pair or second pair of recesses receives rearward legs of right and left suspension support members.

9. The vehicular frame assembly according to claim 8 wherein the first end of each of the first and second control arm support brackets cooperate to pivotally support a first vehicular control arm and the second end of each the first and second control arm support brackets cooperate to pivotally support a second vehicular control arm.

10. The vehicular frame assembly of claim 8 wherein the first pair of recesses faces away from the second pair of recesses when the first and second control arm support brackets are secured to a vehicular frame.

11. The vehicular frame assembly of claim 8 wherein the first end and the second end of the first control arm support bracket each respectively define one recess of the first pair of recesses and the first end and the second end of the second control arm support bracket each respectively define one recess of the second pair of recesses.

12. The vehicular frame assembly of claim 8 wherein the first pair of recesses and the second pair of recesses are U-shaped.

13. A method for assembling a vehicular frame assembly, the method comprising:

providing a vehicular frame, the vehicular frame being intersected by an imaginary plane which bisects the frame into left and right sides;

securing a left suspension support to the vehicular frame, the left suspension support comprising a left forward leg and a left rearward leg;

securing a right suspension support to the vehicular frame, the right suspension support comprising a right forward leg and a right rearward leg;

providing a pair of substantially identical control arm support brackets, each control arm support bracket comprising a first end, a second end, and a sidewall at least partially defining a pair of U-shaped recesses; and arranging the pair of control arm support brackets in differing orientations along the vehicular frame such that the left and right forward legs are at least partially disposed within one pair of recesses and the left and right rearward legs are at least partially disposed within the other pair of recesses.

14. The method of claim 13 further comprising securing the pair of control arm support brackets to the vehicular frame.

15. The method of claim 14 wherein the pair of control arm support brackets each comprise a first end and a second end and wherein the method further comprises:

pivotally supporting a left control arm with the first ends of the pair of control arm support brackets; and pivotally supporting a right control arm with the second ends of the pair of control arm support brackets.

16. The method of claim 15 further comprising supporting a left cushion between the left suspension support member and the left control arm and supporting a right cushion between the right suspension support member and the right control arm.

17. A vehicular frame assembly comprising:

a frame intersected by an imaginary plane which bisects the frame into left and right sides;

a left suspension support member coupled with the left side of the frame and comprising a left forward leg and a left rearward leg;

a right suspension support member coupled with the right side of the frame and comprising a right forward leg and a right rearward leg; and a pair of control arm support brackets, each control arm support bracket defining a pair of recesses, one of the control arm support brackets being secured to the frame in a first orientation such that the left forward leg of the left suspension support member and the right forward leg of the right suspension support member are at least partially disposed within respective ones of the pair of recesses defined by the one control arm support bracket and the other of the control arm support brackets being secured to the frame in a second orientation such that the left rearward leg of the left suspension support member and the right rearward leg of the right suspension support member are at least partially disposed within respective ones of the pair of recesses defined by the other control arm support bracket;

wherein the control arm support brackets are substantially identical to facilitate arrangement of each control arm support bracket in either the first orientation or the second orientation.

18. The vehicular frame assembly of claim 17 wherein the pair of control arm support brackets each comprises a first end and a second end, and wherein the frame assembly further comprises:
a right control arm pivotally supported by respective first ends of the pair of control arm support brackets; and
a left control arm pivotally supported by respective second ends of the pair of control arm support brackets.

19. The vehicular frame assembly of claim 17 wherein the recesses are substantially U-shaped.

20. The vehicular frame assembly of claim 17 wherein one pair of recesses faces forwardly and the other pair of recesses faces rearwardly when the pair of control arm support brackets are secured to the frame.

21. The vehicular frame assembly of claim 17 further comprising a left cushion and a right cushion, wherein the left cushion is supported between the left suspension support member and the left control arm and the right cushion is supported between the right suspension support member and the right control arm.

22. A vehicle comprising the vehicular frame assembly of claim 17.

* * * * *